(12) United States Patent
Brueck et al.

(10) Patent No.: US 8,377,390 B1
(45) Date of Patent: Feb. 19, 2013

(54) ANISOTROPIC WETTING BEHAVIOR ON ONE-DIMENSIONAL PATTERNED SURFACES FOR APPLICATIONS TO MICROFLUIDIC DEVICES

(75) Inventors: Steven R. J. Brueck, Albuquerque, NM (US); Deying Xia, Newton, MA (US)

(73) Assignee: STC.UNM, Albuquerque, NM (US)

( * ) Notice: Subject to any disclaimer, the term of this patent is extended or adjusted under 35 U.S.C. 154(b) by 419 days.

(21) Appl. No.: 12/475,371

(22) Filed: May 29, 2009

Related U.S. Application Data

(60) Provisional application No. 61/056,980, filed on May 29, 2008.

(51) Int. Cl.
*B01J 19/00* (2006.01)
*B32B 3/10* (2006.01)

(52) U.S. Cl. ....... 422/503; 422/68.1; 422/129; 422/504; 422/507; 427/256; 427/284; 428/195.1; 428/206; 430/296; 430/322; 264/293; 977/773

(58) Field of Classification Search ................ 422/68.1, 422/129, 503, 504, 507; 264/293; 427/256, 427/284; 428/195.1, 206; 430/296, 322; 977/773
See application file for complete search history.

(56) References Cited

U.S. PATENT DOCUMENTS

| | | | |
|---|---|---|---|
| 7,090,783 B1 * | 8/2006 | Cui et al. | 216/40 |
| 2002/0172621 A1 * | 11/2002 | Barbera-Guillem | 422/100 |
| 2003/0111494 A1 * | 6/2003 | Lin et al. | 222/505 |
| 2003/0148401 A1 * | 8/2003 | Agrawal et al. | 435/7.9 |
| 2004/0053290 A1 * | 3/2004 | Terbrueggen et al. | 435/6 |
| 2005/0208539 A1 * | 9/2005 | Vann et al. | 435/6 |
| 2006/0108287 A1 * | 5/2006 | Arnold et al. | 210/638 |
| 2007/0190783 A1 * | 8/2007 | Gomez et al. | 438/687 |
| 2008/0299327 A1 * | 12/2008 | Salleo et al. | 427/595 |
| 2010/0316842 A1 * | 12/2010 | Tuteja et al. | 428/143 |

FOREIGN PATENT DOCUMENTS

WO    WO2009/009185    *    1/2009

* cited by examiner

*Primary Examiner* — In Suk Bullock
*Assistant Examiner* — Timothy G Kingan
(74) *Attorney, Agent, or Firm* — MH2 Technology Law Group, LLP

(57) ABSTRACT

In accordance with the invention, there are surfaces exhibiting anisotropic wetting, microfluidic devices and microreactors including the surfaces and methods of controlling anisotropic wetting behavior of the surfaces. The exemplary surface can include a substrate and a plurality of rectangular shaped structures arranged to form a macroscopic pattern over the substrate, wherein the plurality of rectangular shaped structures delineate a top surface of the rectangular structures from a surface of the substrate, the rectangular shaped structures including substantially vertical walls having a height of about 100 nm to about 10 μm and wherein the shape of the macroscopic pattern, the height of the substantially vertical walls, and a surface chemistry of the top surface controls anisotropic wetting at the top surface of the rectangular structures.

24 Claims, 11 Drawing Sheets

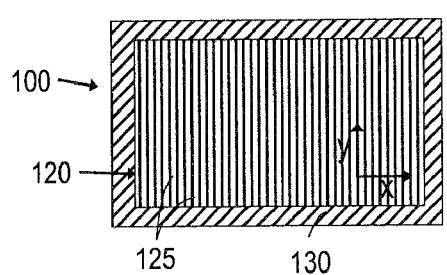
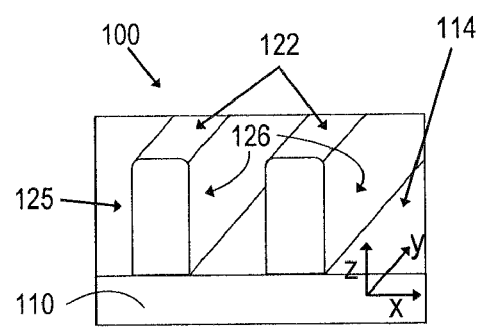
FIG. 1A                FIG. 1B
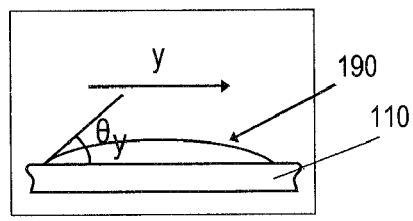
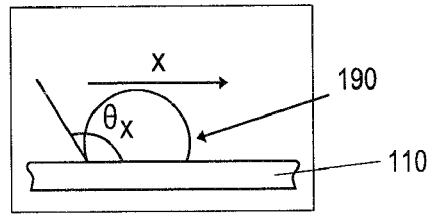
FIG. 1C                FIG. 1D

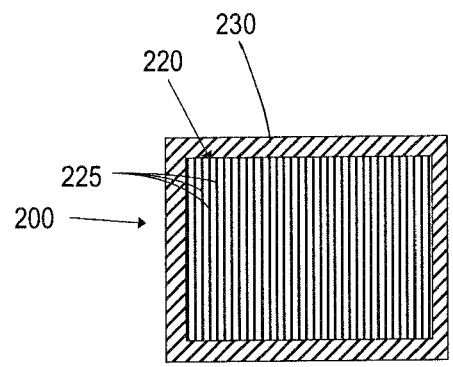 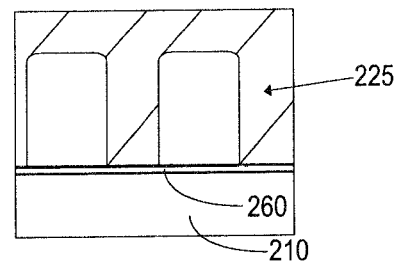
FIG. 2A  FIG. 2B
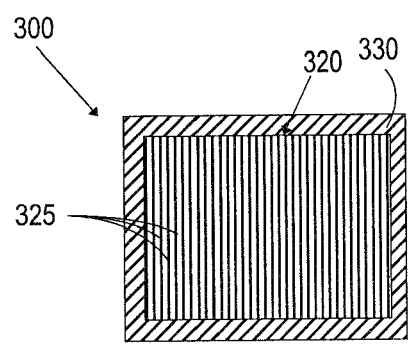 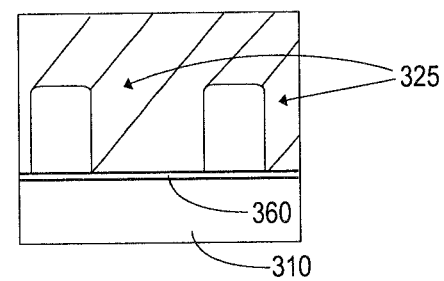
FIG. 3A  FIG. 3B

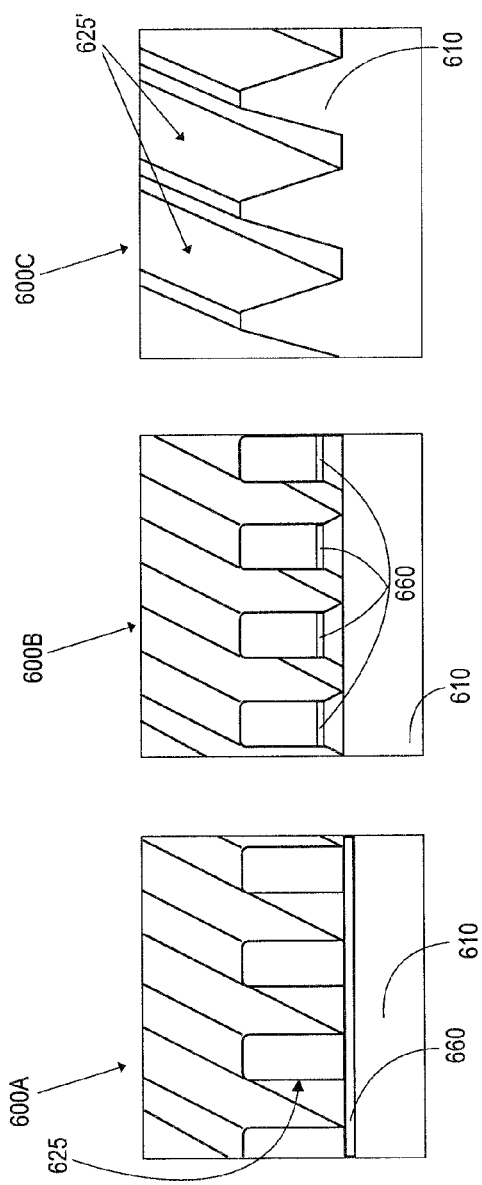

ANISOTROPIC WETTING BEHAVIOR ON ONE-DIMENSIONAL PATTERNED SURFACES FOR APPLICATIONS TO MICROFLUIDIC DEVICES

RELATED APPLICATIONS

This application claims priority from U.S. Provisional Patent Application Ser. No. 61/056,980, filed May 29, 2008, which is hereby incorporated by reference in its entirety.

GOVERNMENT RIGHTS

This invention was made with government support under Grant No. 0515684 awarded by the National Science Foundation. The government has certain rights in the invention.

FIELD OF THE INVENTION

The subject matter of this invention relates to microfluidic devices. More particularly, the subject matter of this invention relates to methods of controlling anisotropic wetting behavior of a surface.

BACKGROUND OF THE INVENTION

Anisotropic wetting phenomenon on structured solid surfaces is of both fundamental and technological interest. Surfaces with controlled anisotropic wetting have the advantages of confining liquid flow to a desired direction, with potential applications in microfluidic devices, evaporation-driven formation of patterns, and easy-clean coatings. Anisotropic wetting has been observed in nature and biomimetic structures have been fabricated with various techniques including aligned carbon nanotubes (CNT). Anisotropic wetting behavior is also observed on one-dimensional (1D) patterned surfaces achieved either through chemical patterning or surface roughness. Drainage enhancement has been reported with the aid of wetting anisotropy on etched 1D aluminum surfaces. However, most of the literature on anisotropic wetting behavior is concerned with relatively low degrees of anisotropy on surfaces with micrometer-scale parallel grooves. There have been relatively few papers reporting strong anisotropic wetting behavior, the variation of the wetting behavior over large material variations, or the evaporation dynamics of anisotropic liquid droplets. There have been reports of modifying the wetting behavior on isotropic surfaces, but it remains a challenge to adjust anisotropic wetting properties with simple, effective and low cost techniques.

Hence, there is a need to develop a simple, effective, and low cost method of controlling anisotropic wetting behavior of a surface.

SUMMARY OF THE INVENTION

In accordance with various embodiments, there is a surface including a substrate, a plurality of rectangular shaped structures arranged to form a macroscopic pattern over the substrate, wherein the plurality of rectangular shaped structures delineate a top surface of the rectangular structures from a surface of the substrate, the rectangular shaped structures comprising substantially vertical walls having a height of about 100 nm to about 10 µm and wherein a shape of the macroscopic pattern, the height of the substantially vertical walls, and a surface chemistry of the top surface controls anisotropic wetting at the top surface of the rectangular structures.

According to various embodiments, there is a method for using a pattern to control fluid flow. The method can include depositing a photosensitive film stack over a substrate and forming a macroscopic pattern on the film stack, the macroscopic pattern can include a plurality of rectangular shaped structures, wherein the plurality of rectangular shaped structures delineate a top surface of the rectangular structures from a surface of the substrate, the rectangular shaped structures comprising substantially vertical walls having a height of about 100 nm to about 10 µm and wherein a shape of the macroscopic pattern, the height of the substantially vertical walls, and a surface chemistry of the top surface controls anisotropic wetting at the top surface of the rectangular structures. The method can also include delimiting the macroscopic pattern and tuning the anisotropic wetting at the top surface of the rectangular structures to guide the fluid flow on top of the pattern, wherein the fluid flow can be controlled using one or more of gravity, electric field, and magnetic field.

In accordance with another embodiment, there is a method of confining liquid in limited area structures. The method can include depositing a photosensitive film stack over a substrate and forming a pattern on the film stack, the pattern can include a plurality of rectangular shaped structures, wherein the plurality of rectangular shaped structures delineate a top surface of the rectangular structures from a surface of the substrate, the rectangular shaped structures comprising substantially vertical walls having a height of about 100 nm to about 10 µm and wherein a shape of the macroscopic pattern, the height of the substantially vertical walls, and a surface chemistry of the top surface controls anisotropic wetting at the top surface of the rectangular structures. The method can also include delimiting the pattern and tuning the anisotropic wetting at the top surface of the rectangular structures to guide the fluid flow on top of the pattern. The method can further include immersing and removing the substrate in a liquid bath, wherein upon removal the liquid is confined only to the pattern.

According to various embodiments, there is a method including guiding a small defined droplet using a plurality of rectangular structures surrounded by a hydrophobic region.

According to another embodiment, there is a method of segregating particles. The method can include providing an anisotropic hydrophobic surface, wherein the surface can include a pattern, the pattern including a plurality of rectangular shaped structures, wherein the plurality of rectangular shaped structures delineate a top surface of the rectangular structures from a surface of the substrate, the rectangular shaped structures comprising substantially vertical walls having a height of about 100 nm to about 10 µm wherein a shape of the macroscopic pattern, the height of the substantially vertical walls, and a surface chemistry of the top surface controls anisotropic wetting at the top surface of the rectangular structures. The method can also include providing a liquid including colloidal particles over the anisotropic hydrophobic surface. The method can further include evaporating the liquid over the anisotropic hydrophobic surface, wherein the liquid evaporates with an initial decrease of the contact angle with only a small change of the contact line, such that a wide band of particles can be deposited at the two circular ends and narrow band along the contact line connecting the two circular ends.

Additional advantages of the embodiments will be set forth in part in the description which follows, and in part will be obvious from the description, or may be learned by practice of the invention. The advantages will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

BRIEF DESCRIPTION OF THE DRAWINGS

FIG. 1A shows a schematic illustration of an exemplary surface comprising a pattern, according to various embodiments of the present teachings.

FIG. 1B shows a close up perspective view of the schematic illustration of the exemplary surface shown in FIG. 1A, according to various embodiments of the present teachings.

FIGS. 1C and 1D show contact angles $\theta_y$ and $\theta_x$ measured parallel and orthogonal to the direction of the pattern shown in FIG. 1A, according to various embodiments of the present teachings.

FIG. 2A shows a schematic illustration of an exemplary surface comprising a photoresist pattern, according to various embodiments of the present teachings.

FIG. 2B shows a close up perspective view of the schematic illustration of the exemplary surface shown in FIG. 2A, according to various embodiments of the present teachings.

FIG. 3A shows a schematic illustration of another exemplary surface comprising a photoresist pattern, according to various embodiments of the present teachings.

FIG. 3B shows a close up perspective view of the schematic illustration of the exemplary surface shown in FIG. 3A, according to various embodiments of the present teachings.

FIG. 6 shows schematic illustration of perspective views of deep silicon grooves fabricated with negative photoresist: (a) photoresist; (b) after etching antireflective coating; and (c) silicon grooves, according to various embodiments of the present teachings.

FIG. 7 shows schematic illustration of perspective views of (a) positive photoresist pattern; (b) after spin coating with negative photoresist, according to various embodiments of the present teachings.

DESCRIPTION OF THE EMBODIMENTS

Figure 4:
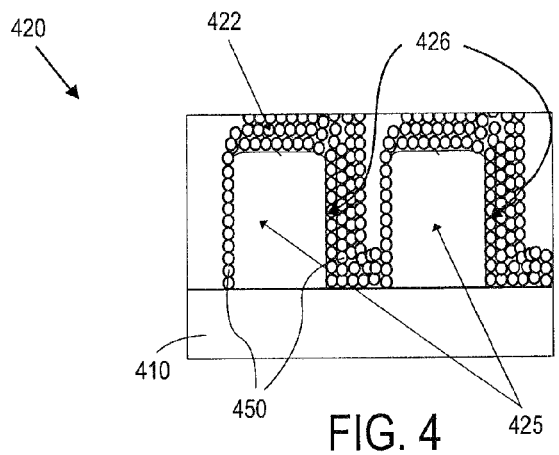
FIG. 4 shows a schematic illustration of a perspective view of an exemplary photoresist pattern with a layer of silica nanoparticles over the photoresist pattern, according to various embodiments of the present teachings.

Reference will now be made in detail to the present embodiments, examples of which are illustrated in the accompanying drawings. Wherever possible, the same reference numbers will be used throughout the drawings to refer to the same or like parts.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less that 10" can assume negative values, e.g. −1, −2, −3, −10, −20, −30, etc.

As used herein, the terms "hydrophobic" and "hydrophobicity" refer to the wettability of a surface that has a water contact angle of approximately 45° or more; the terms "ultra-hydrophobic" and "ultra-hydrophobicity" refer to the wettability of a surface that has a water contact angle of approximately 120° or more; the terms "super-hydrophobic" and "super-hydrophobicity" refer to the wettability of a surface that has a water contact angle of approximately 150° or more; the terms "hydrophilic" and "hydrophilicity" refer to the wettability of a surface that has a water contact angle below about 45°; and the terms "super-hydrophilic" and "super-hydrophilicity" refer to the wettability of a surface that has almost a water contact angle of less than about 5°.

FIG. 1A shows a schematic illustration of an exemplary surface 100 including a plurality of rectangular shaped structures 125 arranged to form a macroscopic pattern 120 over a substrate 110, wherein the plurality of rectangular shaped structures 125 delineate a top surface 122 of the rectangular structures 125 from a surface 114 of the substrate 110. The term "rectangular shaped structures" is used herein synonymously with "photoresist lines," "1D structures" and "photoresist walls". The surface 100 can also include a region 130 surrounding the pattern 120 to confine water droplets to the pattern 120. In various embodiments, the region 130 can include a layer of one or more hydrophobic polymers, including, but not limited to, photoresist, poly(methyl methacrylate), and poly (dimethylsiloxane).

The macroscopic pattern 120 over the substrate 110 can be formed using any suitable method such as, for example, photolithography, nanoimprint lithography, interferometric lithography, e-beam lithography, ion-beam lithography, strained micro-wrinkling, and embossing. Any suitable substrate 110 can be used, including, but not limited to, a silicon wafer, quartz, glass, and sapphire. In various embodiments, the pattern 120 can formed on a positive or a negative photoresist, such as, for example, an i-line photoresist, a g-line, or a deep UV photoresist. A non limiting exemplary positive photoresist can be SPR510A manufactured by Shipley/Rohm & Haas Electronic Materials (Marlborough, Mass.), and a non limiting exemplary negative photoresist can be NR7-500P, manufactured by Futurrex, Inc. (Franklin, N.J.).

In various embodiments, the shape of the macroscopic pattern 120, the height of the substantially vertical walls 126, and a surface chemistry of the top surface 122 controls anisotropic wetting at the top surface 122 of the rectangular structures 125. In some cases, the substantially vertical walls 126 can have a height from about 100 nm to about 10 μm, and in other cases from about 500 nm to about 2 µm. In various embodiments, the rectangular shaped structures 125 can have a width from about 100 nm to about 2 µm, and in other cases from about 500 nm to about 1 µm. In some embodiments, the height and width can be the same. In other embodiments, the height and width can be different. In some cases, the distance between the rectangular shaped structures can be from about 100 nm to about 1 µm and in other cases from about 250 nm to about 500 nm. The pattern 120 can have any suitable period. In some cases, the pattern 120 can have a period in the range of about 100 nm to about 2 µm and in other cases, in the range of about 500 nm to about 1500 nm. In various embodiments, the surface 100 can include a plurality of patterns having a multiple length scales. In other, the surface 100 can include one or more patterns 120 on a nanometer scale and one or more patterns on a micrometer scale.

In various embodiments, the pattern 120 can also include surface treatment to tailor the anisotropic wetting to be at least one of hydrophobic, an ultra-hydrophobic, a super-hydrophobic, a hydrophilic, and a super-hydrophilic. In certain embodiments, the surface treatment can include a thin layer of nanoparticles disposed over the pattern, 120. Any suitable nanoparticles can be used, including, but not limiting to, silica nanoparticles, polystyrene beads, composite core-shell nanoparticles, and composite core-shell nanoparticles including one or more of functionalized core and functionalized shell. FIG. 4 shows a schematic illustration of an exemplary surface including a photoresist pattern 420, the pattern 420 including a plurality of rectangular structures 425 and a layer of nanoparticle 450 disposed over the photoresist pattern 420.

In some embodiments, the surface 100, 400 can include a layer of functionalized nanoparticles 450 disposed over the pattern 120, 420. In other embodiments, the functionalized nanoparticles can be functionalized for one or more of photonics, catalysis, chemical/biological sensing, separation, bio-mimic structure, and nanofluidic applications.

In various embodiments, the surface treatment can also include plasma treatment of the pattern 120, 420 with one or more gases selected from the group consisting of oxygen, $CF_4$, and $CHF_3$, $CH_2F_2$, $CH_3F$, and other related carbon-hydride-halide species. Exemplary carbon-hydride-halide species can include, but are not limited to, carbon-chloro species such as, for example, $CCl_4$, $CHCl_3$ and carbon-bromo species such as, for example, $CBr_4$, $CHBr_3$, etc. In some embodiments, a short $CHF_3$ plasma treatment of a pattern can change the wetting behavior from strongly anisotropic and hydrophobic to only slightly anisotropic and ultra-hydrophobic and/or super-hydrophobic. As used herein, a short $CHF_3$ plasma treatment refers to plasma treatment using $CHF_3$ that is sufficient to cause a change in the surface chemistry of the pattern 120, but is too short to change the structural profile of the pattern 120 significantly. One of ordinary skill in the art would know that actual time for the short $CHF_3$ plasma treatment will depend on the details of the processing conditions and apparatus. In other embodiments, a longer $CHF_3$ plasma treatment of a pattern can exhibit lower anisotropy and can became more hydrophobic, ultra-hydrophobic, and even super-hydrophobic with possible formation of multiple length scale patterns. In some other embodiments, a short oxygen plasma treatment of a pattern can change the wetting behavior from strongly anisotropic and hydrophobic to only slightly anisotropic and ultra-hydrophilic and/or super-hydrophobic. As used herein, a short oxygen plasma treatment refers to plasma treatment using oxygen that causes less than about 10% change in the one or more structural dimensions of the pattern 120. One of ordinary skill in the art would know that actual time for the short oxygen plasma treatment will depend on the details of the processing conditions and apparatus. Hence, in various embodiments, one can tailor anisotropic wetting while retaining the structural anisotropy using simple and controllable plasma treatments.

In various embodiments, there is a method to partially recover the anisotropic wetting of 1D photoresist pattern after plasma treatment. The method can include forming a layer of polymer over the plasma treated pattern. In some embodiments, the method can include depositing a thin layer of negative photoresist over the plasma-treated positive photoresist pattern. In other embodiments, the method can include depositing a thin layer of positive photoresist over the plasma-treated negative photoresist pattern. In some other embodiments, the method to partially recover strongly anisotropic wetting can include forming a conformal layer of polymer by plasma polymer deposition.

In various embodiments, there can be a microfluidic device including the surface 100, 200, 300, 400, 600A, 600B, 600C, 700A, 700B shown in FIGS. 1A, 2, 3, 4, 6, and 7. In some embodiments, there can be a microreactor including the surface 100, 200, 300, 400, 600A, 600B, 600C, 700A, 700B shown in FIGS. 1A, 2, 3, 4, 6, and 7. A microreactor is a device used for chemical and or biochemical reactions at a microscale level. In some other embodiments, there can be a lab-on-a-chip system including the surface 100, 200, 300, 400, 600A, 600B, 600C, 700A, 700B shown in FIGS. 1A, 2, 3, 4, 6, and 7.

Figure 9A:
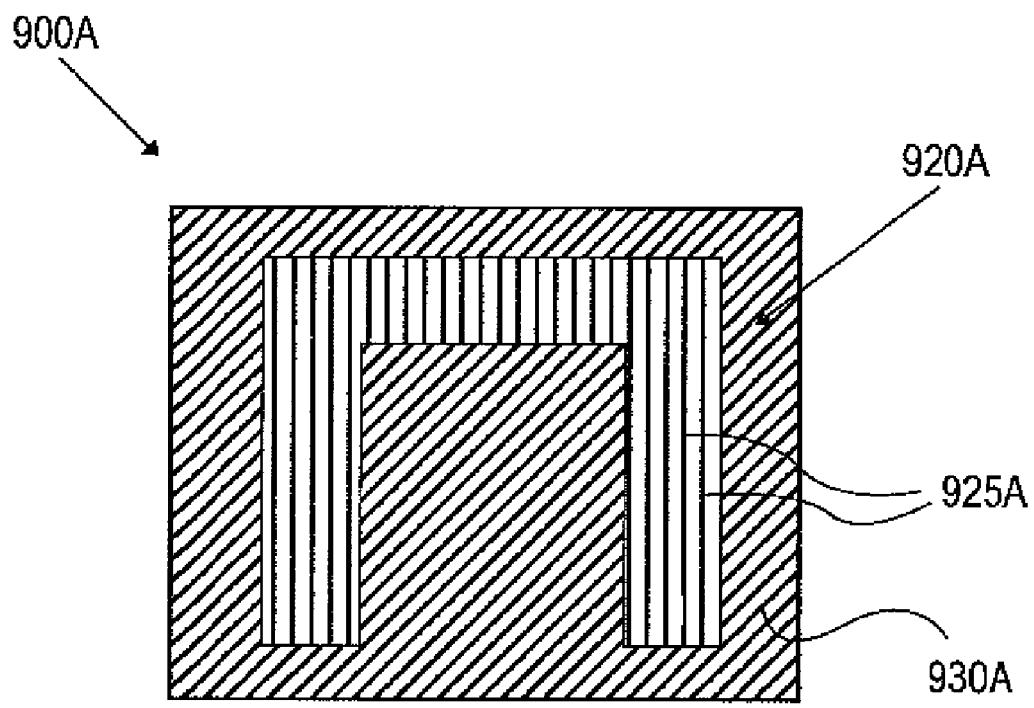
FIGS. 9A-9G show schematic illustration of exemplary surfaces comprising patterns, according to various embodiments of the present teachings.
Figures 9B, 9C:
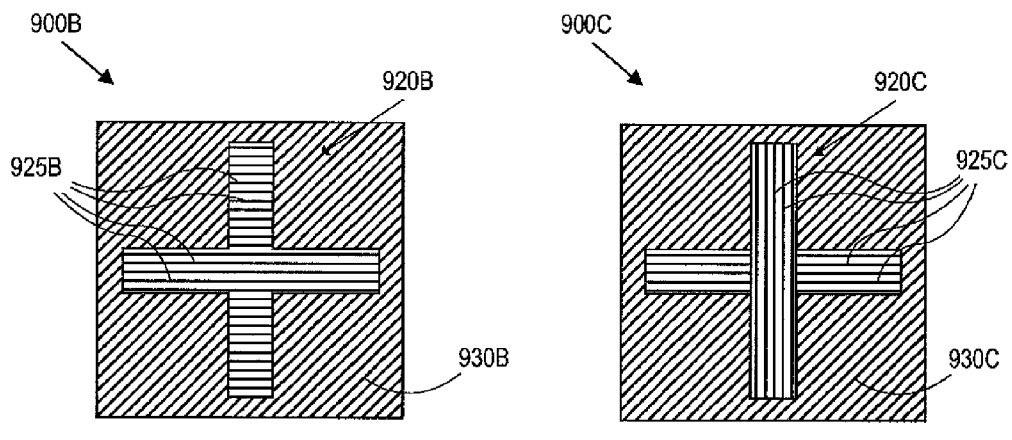
Figure 9D:
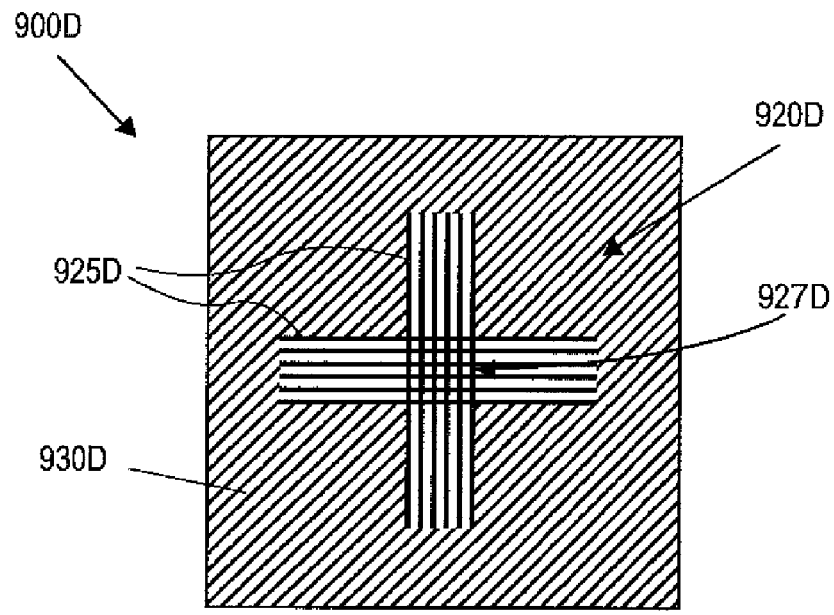
Figure 9E:
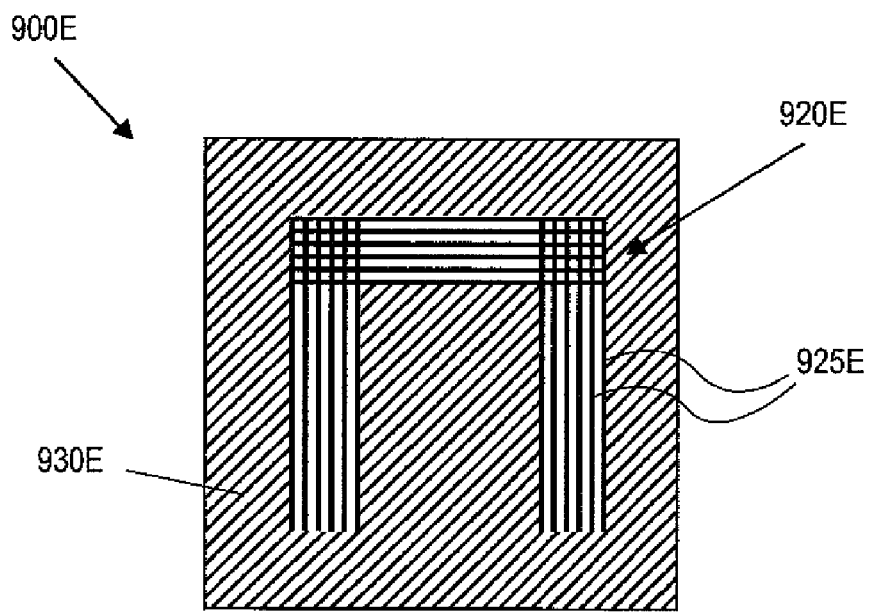
Figure 9F:
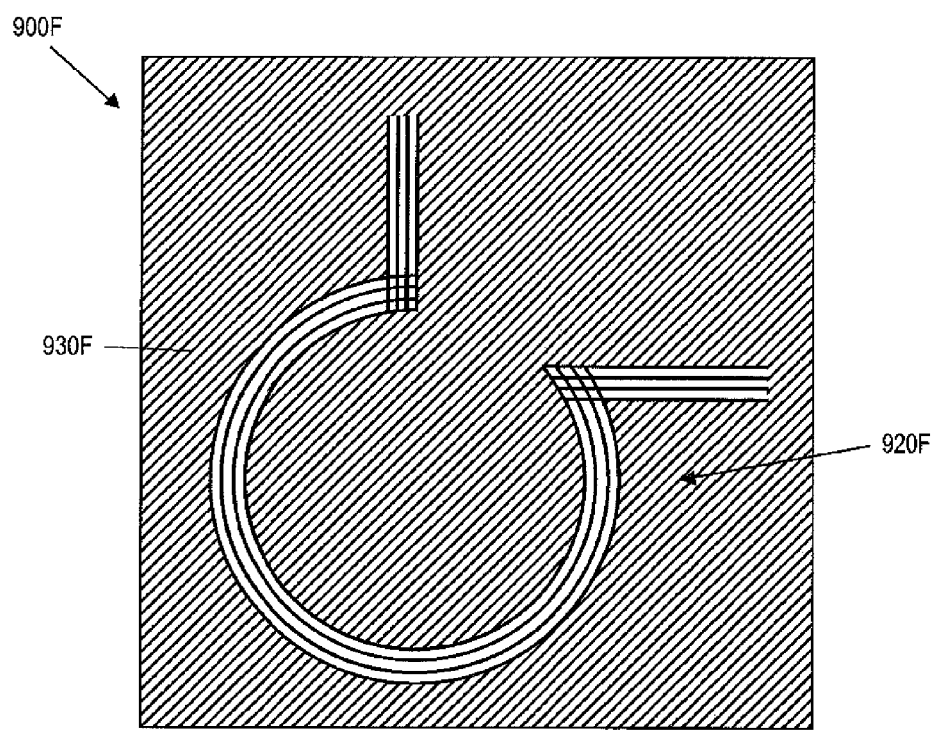
Figure 9G:
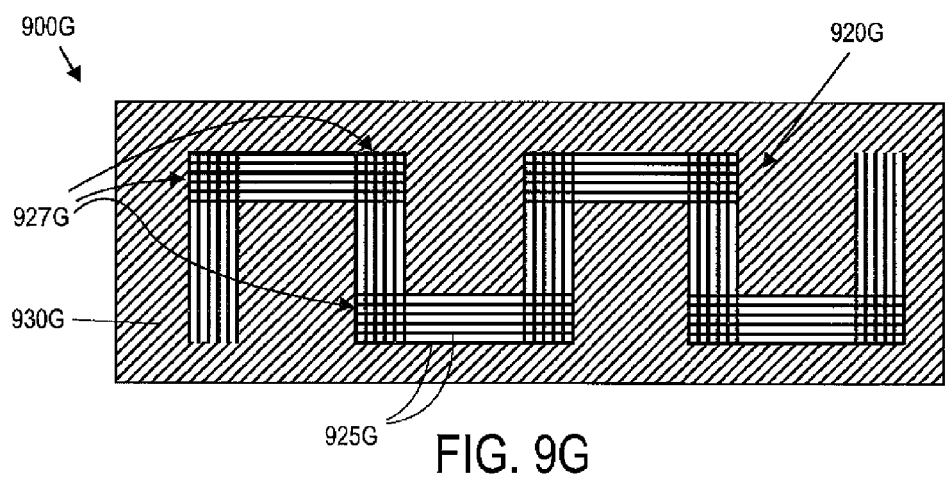

In various embodiments, one or more rectangular shaped structures 920A-G can be arranged in one or more ways including, but not limited to, straight, circular, square, and serpentine, as shown in FIGS. 9A-9G. In some embodiments, the plurality of rectangular shaped structures are arranged to form a plurality of patterns, wherein the plurality of patterns are arranged in one of the ways including, but not limited to, parallel, at an angle, and perpendicular, as shown in FIGS. 9A-9G. In particular, FIG. 9A shows surface 900A including a "u"-shaped pattern 920A wherein all of the rectangular structures 925A can be oriented in the same direction. FIGS. 9B and 9C shows two exemplary surfaces 900B and 900C including a cross-shaped pattern 920B, 920C in which the rectangular structures 925B, 925C can either be in the same direction 925B or in orthogonal directions 925C. FIG. 9D shows another exemplary surface 900D including a cross-shaped pattern 920D in which the orientation of the rectangular structures 925D can be orthogonal. In various embodiments, the pattern 920D can also include a 2D pattern 927D at the intersection between different orientations of the rectangular structures 925D. FIG. 9E shows another surface including a "u"-shaped pattern 920A in which the orientation of the rectangular structures 925E can be orthogonal. FIG. 9F shows a surface 900F including a circular pattern 920F and FIG. 9G shows a surface 900G including a serpentine shaped pattern 920G, in which the orientation of the rectangular structures can be orthogonal. In various embodiments, the pattern 920G can also include a 2D pattern 927G at the intersection between different orientations of the rectangular structures. In various embodiments, the surface 900A-G can also include a region 930A-G surrounding the pattern 920A-G to confine water droplets to the pattern 920A-G. The wetting characteristics of some of these patterns 920A-G are described in Xia et. al., Nano Letters, 2008, Vol. 8, No. 9, 2819-2824, which is incorporated by reference herein in its entirety. It is envisioned that complex networks can be formed to define water patterns in microfluidic devices or for guiding reactants in microreactors using these macro-patterned anisotropic wetting structures. In various embodiments, using one or more of gravity, electric field, and magnetic field one can direct fluid entering the 2D pattern 927D at the intersection of the rectangular structures 925D in one or more directions, as shown in FIG. 9D.

Figure 8:
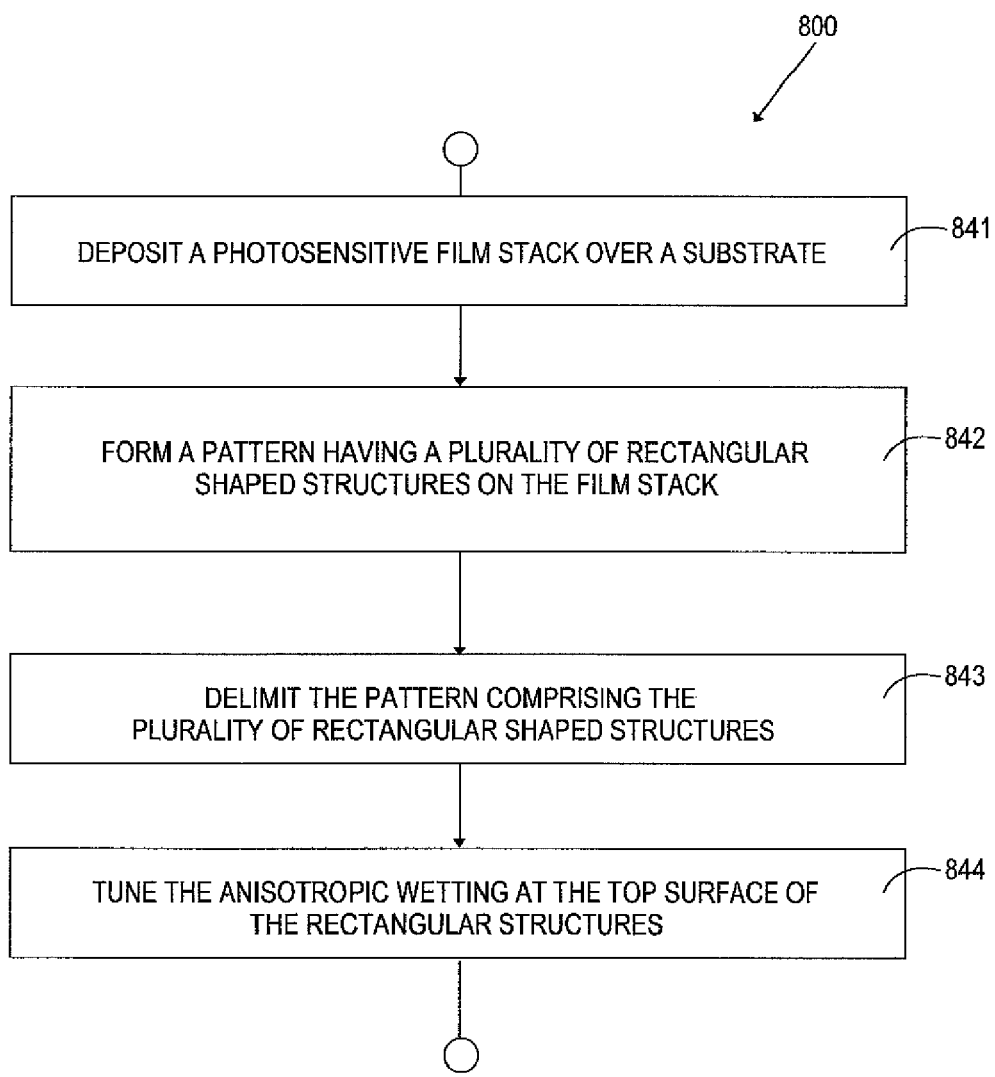
FIG. 8 shows a flow diagram for a method for using a pattern to control fluid flow, according to various embodiments of the present teachings.

According to various embodiments, there is a method 800 for using a pattern to control fluid flow, as shown in FIG. 8. The method 800 can include a step 841 of depositing a photosensitive film stack over a substrate. In some embodiments, the step of depositing a photosensitive film stack can include depositing a first layer including an antireflective coating over the substrate and depositing a second layer including a photoresist over the first layer. In accordance with various embodiments, the first layer can include a bottom anti-reflective coating (BARC) designed for the specific photoresist being used; the function of this BARC layer is to reduce reflections from the substrate that give rise to vertical standing wave patterns in the developed photoresist. In various embodiments, the first layer can include an i-line BARC, or a g-line BARC, or a deep UV BARC. Non limiting examples of BARC can be XHRIC-16 and Wet-i™ 10-7, manufactured by Brewer Science, Inc. (Rolla, Mo.). In various embodiments, the first layer can be deposited using standard spin coating procedure. In other embodiments, the deposition of the first layer can also include baking the first layer at a temperature from about 100° C. to about 250° C. for about 60 second to about 120 second. In general, standard processing steps including a prebake of the BARC layer to drive off volatile compounds before deposition of the second (photoresist) layer is deposited are followed. The second layer can include a layer of positive photoresist or a layer of negative photoresist. In certain embodiments, the photoresist can be an i-line photoresist. In other embodiments, the photoresist can be a g-line or a deep UV photoresist. A non limiting exemplary positive photoresist can be SPR510A manufactured by Shipley/Rohm & Haas Electronic Materials (Marlborough, Mass.), and a non limiting exemplary negative photoresist can be NR7-500P, manufactured by Futurrex, Inc. (Franklin, N.J.). The deposition of the second layer including photoresist can also include a baking step to remove residual solvent. In various embodiments, the first layer and the second layer can have any suitable thickness. In some embodiments, the first layer including an antireflective coating can have a thickness from about 50 nm to about 500 nm and the second layer including a photoresist can have a thickness from about 100 nm to about 10,000 nm. In various embodiments, the first layer an antireflective coating can have a thickness from about 50 nm to about 200 nm and the second layer including a photoresist can have a thickness from about 200 nm to about 4000 nm. In some other embodiments, the second layer including a photoresist can have a thickness from about 500 nm to about 1500 nm. However, the BARC layer can have any suitable thickness to reduce the reflections and the thickness can depend on the wavelength and the angle of incidence of the exposing radiation. Furthermore, any suitable thickness of the photoresist layer can be chosen to adjust the properties of the final surface.

The method 800 for using a pattern to control fluid flow, as shown in FIG. 8 can also include a step 842 of forming a macroscopic pattern on the film stack, the macroscopic pattern including a plurality of the rectangular shaped structures. In various embodiments, the plurality of rectangular shaped structures delineate a top surface of the rectangular structures from a surface of the substrate, the rectangular shaped structures comprising substantially vertical walls having a height of about 100 nm to about 10 μm and wherein the shape of the macroscopic pattern, the height of the substantially vertical walls, and a surface chemistry of the top surface can control anisotropic wetting at the top surface of the rectangular structures. Any suitable technique can be used to form the macroscopic pattern on the film stack, including, but not limited to, photolithography, nanoimprint lithography, interferometric lithography, e-beam lithography, ion-beam lithography, strained micro-wrinkling, and embossing. U.S. patent application Ser. No. 11/549,732 describes in detail the interferometric lithography, the disclosure of which is incorporated by reference herein in its entirety. According to various embodiments, a laser in the UV range consistent with the photosensitivity of the film stack can be used to form the periodic interference pattern on the film stack, for example, a 248 nm laser can be used for deep UV photoresist and a 355 nm laser can be used for i-line photoresist. Non-limiting examples of a laser in the UV range can include a 355 nm tripled yttrium-aluminum-garnet (YAG) laser, a 213 nm fifth harmonic YAG laser, a 248 nm KrF excimer laser, a 193 nm ArF excimer laser, and a 157 nm $F_2$ excimer laser. In some embodiments, the step of forming a pattern on the film stack can include immersion interference lithography. Immersion interference lithography can extend the spatial period of the pattern to $\lambda/2n$, where n is the immersion liquid refractive index. In other embodiments, the method of forming the pattern on the film stack can include conventional lithography either in the ultra-violet (UV) or deep UV region. The step of forming a pattern on the film stack can further include a bake and develop cycle. In some embodiments, the step of forming a pattern on the film stack can further include etching the first layer including an antireflective coating.

In various embodiments, the step 842 of forming a macroscopic pattern on the film stack can also include forming a plurality of rectangular shaped structures, such that one or more rectangular shaped structures can be arranged in one or more ways such as, for example, straight, circular, square, and serpentine. In some embodiments, the 842 of forming a macroscopic pattern on the film stack can include forming a plurality of patterns, each of the plurality of patterns including a plurality of rectangular shaped structures, wherein the plurality of patterns can be arranged in one of the ways selected from the group consisting of parallel, at an angle, serpentine and perpendicular. In various embodiments, the plurality of patterns can be formed in continuous chains so that a droplet can be controlled along the chain. In addition, the continuous chains can contain 2D structures at the intersections wherein the direction of droplet motion can be selected by one or more of gravity, electric field, and magnetic field to provide a sorting or other functionality.

The method 800 for using a pattern to control fluid flow, as shown in FIG. 8 can also include a step 843 of delimiting the macroscopic pattern including the plurality of rectangular shaped structures and a step 844 of tuning the anisotropic wetting at the top surface of the rectangular structures to guide the fluid flow on top of the pattern, wherein the fluid flow is controlled using one or more of gravity, electric field, and magnetic field. In various embodiments, the step 844 of tuning the anisotropic wetting at the top surface of the rectangular structures can include forming a thin layer of nanoparticles over the pattern thereby changing the hydrophobicity of the pattern. In some embodiments, step of forming a thin layer of nanoparticles over the pattern can include spin coating a colloidal dispersion of nanoparticles. In other embodiments, step of forming a thin layer of nanoparticles over the pattern can include alternative deposition techniques such as, but not limited to, dip coating, convective deposition, and layer by layer electrostatic deposition. In some embodiments, the step of forming a thin layer of nanoparticles over the pattern can include forming a thin layer of silica nanoparticles over the pattern. In various embodiments, the step of forming a thin layer of silica nanoparticles over the pattern can include at least one cycle of spin coating using a suspension of silica nanoparticles. In some embodiments, the step of forming a thin layer of silica nanoparticles over the pattern can include can include multiple cycles of spin coating wherein each cycle of spin coating uses a suspension of silica nanoparticles with a same size distribution. In other embodiments, the step of depositing a plurality of silica nanoparticles can include multiple cycles of spin coating wherein at least one cycle of spin coating uses a suspension of silica nanoparticles with a size distribution different than the other cycles of spin coating. Exemplary colloidal solutions of silica nanoparticles can include Snowtex® series of colloidal silica: ST-C with a particle size in the range of about 10 nm to about 20 nm, ST-OL with a particle size in the range of about 40 nm to about 50 nm, and ST-ZL with a particle size in the range of about 70 nm to about 100 nm, manufactured by Nissan Chemical America Corporation (Houston, Tex.). The colloidal solutions of silica nanoparticles can be diluted with deionized water to get the desired concentration for spin coating. In some embodiments, the cycle of spin coating can include baking to remove any residual solvent. In various embodiments, the step of forming a thin layer of nanoparticles over the pattern can further include modifying surface of nanoparticles to provide additional functionality, wherein the surface of nanoparticles is functionalized for one or more of photonics, catalysis, chemical/biological sensing, separation, biomimic structure, and nanofluidic applications.

In certain embodiments, the step 844 of tuning the anisotropic wetting at the top surface of the rectangular structures to control the fluid flow on top of the pattern comprises using plasma treatment of the pattern with one or more gases selected from the group consisting of oxygen, $CF_4$, and $CHF_3$, $CH_2F_2$, $CH_3F$, and other related carbon-halide or carbon-hydride-halide species.

Figure 10:
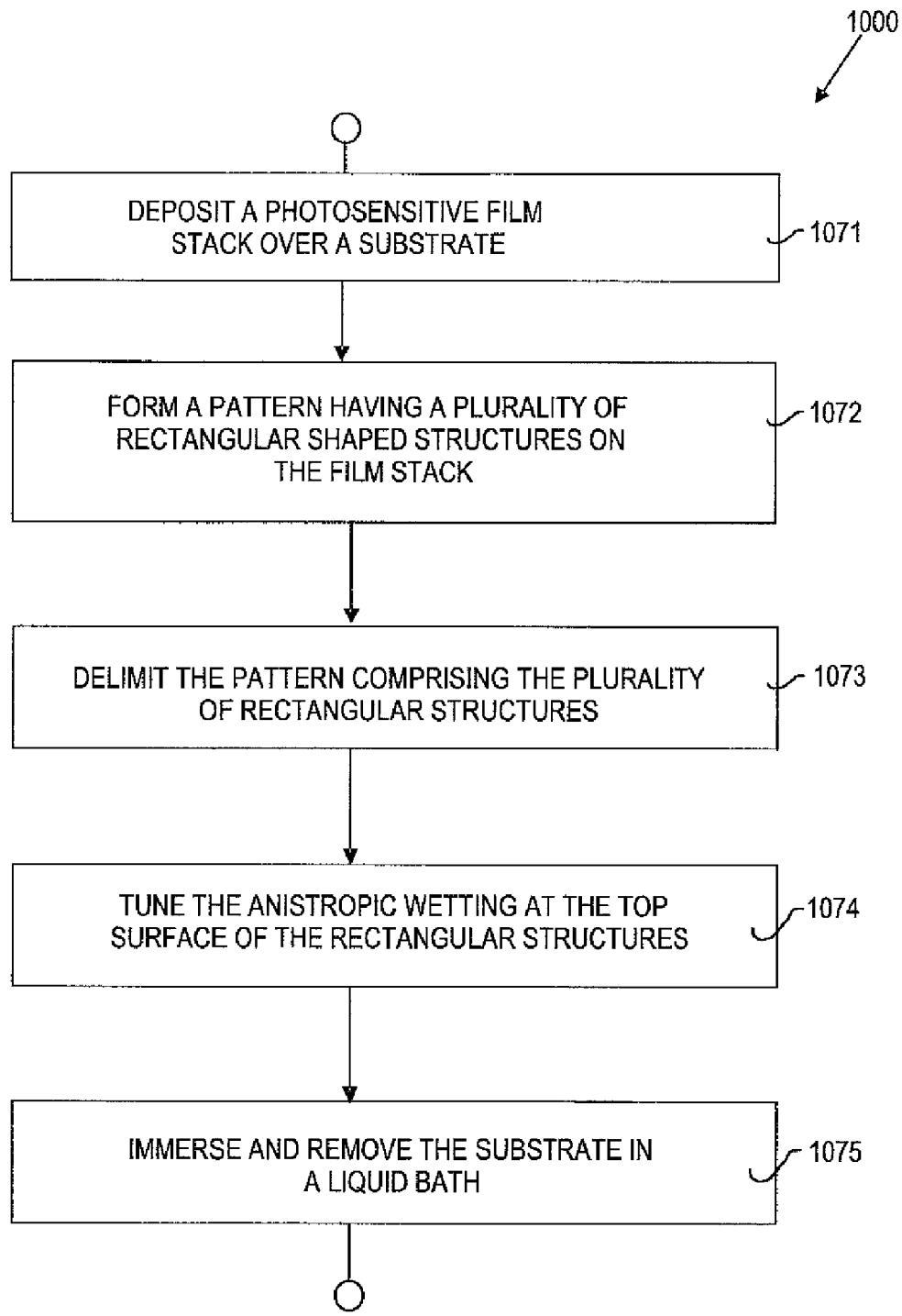
FIG. 10 shows a flow diagram for a method for confining liquid in limited area structures, according to various embodiments of the present teachings.

In some embodiments, the method 800 for using a pattern to control fluid flow can further include transferring the pattern from the film stack onto the substrate using any suitable etching technique, such as, for example, reactive ion etching and chemical etching, According to various embodiments, there is a method 1000 of confining liquid in limited area structures, as shown in FIG. 10. The method 1000 can include a step 1071 of depositing a photosensitive film stack over a substrate and a step 1071 of forming a pattern having a plurality of rectangular shaped structures on the film stack, wherein the plurality of rectangular shaped structures delineate a top surface of the rectangular structures from a surface of the substrate, the rectangular shaped structures comprising substantially vertical walls having a height of about 100 nm to about 10 µm and wherein a shape of the macroscopic pattern, the height of the substantially vertical walls, and a surface chemistry of the top surface can control anisotropic wetting at the top surface of the rectangular structures. The method 1000 can further include a step 1073 of delimiting the pattern and a step 1074 of tuning the anisotropic wetting at the top surface of the rectangular structures. In some embodiments, the step 1074 of tuning the anisotropic wetting at the top surface of the rectangular structures can include forming a thin layer of nanoparticles over the pattern. In other embodiments, the step 1074 of tuning the anisotropic wetting at the top surface of the rectangular structures can include using plasma treatment of the pattern. The method 1000 can also include a step 1075 of immersing and removing the substrate in a liquid bath, wherein upon removal the liquid can be confined only to the pattern.

Figure 11:
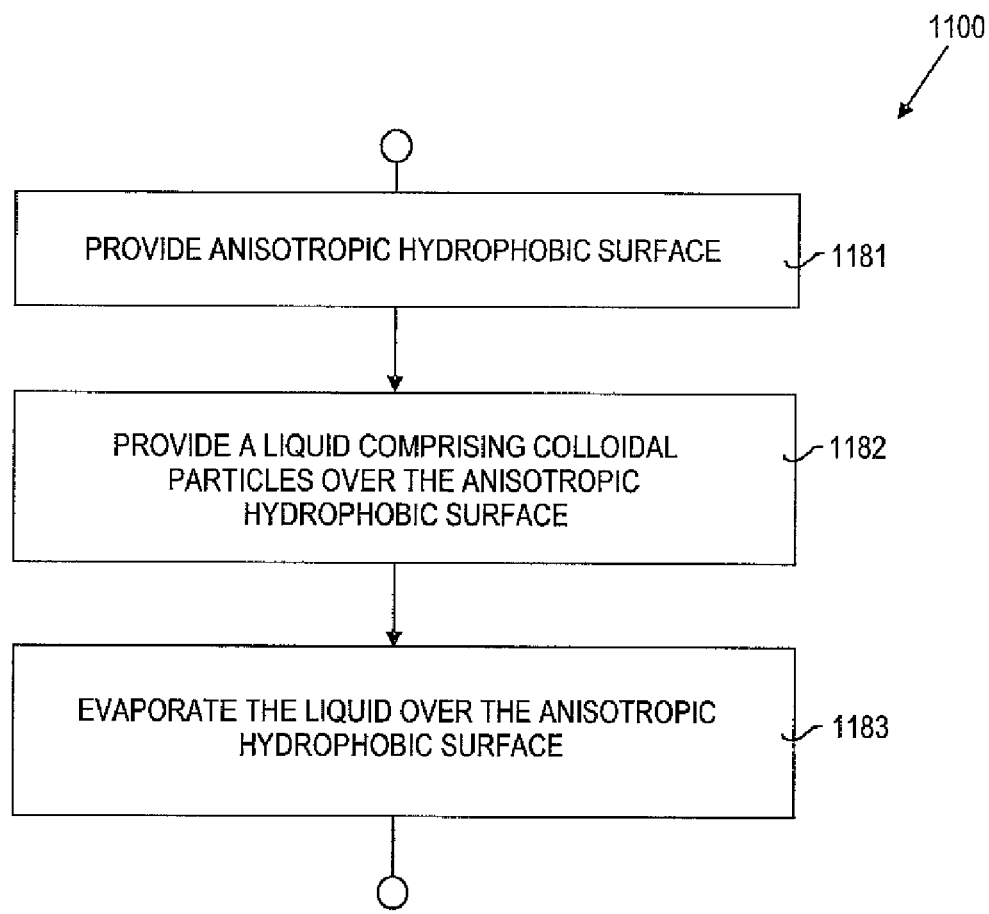
FIG. 11 shows a flow diagram for a method of segregating particles, according to various embodiments of the present teachings.

According to various embodiments, there is a method 1100 of segregating particles, as shown in FIG. 11. The method 1100 can include as step 1181 of providing anisotropic hydrophobic surface, wherein the surface can include a pattern on a substrate, the pattern including a plurality of rectangular shaped structures on a film stack, wherein the plurality of rectangular shaped structures delineate a top surface of the rectangular structures from a surface of the substrate, the rectangular shaped structures comprising substantially vertical walls having a height of about 100 nm to about 10 µm and wherein a shape of the macroscopic pattern, the height of the substantially vertical walls, and a surface chemistry of the top surface can control anisotropic wetting at the top surface of the rectangular structures. The method 1100 can also include a step 1182 of providing a liquid including colloidal particles over the anisotropic hydrophobic surface. The method 1100 can further include a step 1183 of evaporating the liquid over the anisotropic hydrophobic surface, wherein the liquid evaporates with an initial decrease of the contact angle with only a small change of the contact line, such that a wide band of particles can be deposited at the two circular ends and narrow band along the contact line connecting the two circular ends. A more detailed description of evaporation of a water droplet containing polystyrene spheres is described in Xia et. al., Nano Letters, 2008, Vol. 8, No. 9, 2819-2824, the disclosure of which is incorporated by reference herein in its entirety.

Examples are set forth herein below and are illustrative of different amounts and types of reactants and reaction conditions that can be utilized in practicing the disclosure. It will be apparent, however, that the disclosure can be practiced with other amounts and types of reactants and reaction conditions than those used in the examples, and the resulting devices various different properties and uses in accordance with the disclosure above and as pointed out hereinafter.

EXAMPLES

Example 1

Preparation of a Surface Including a Pattern with a Period of about 1500 nm

A developable bottom antireflective coating (BARC, Wet-i™ 10-7, Brewer Science, Inc.) layer was spun on a pre-cleaned silicon substrate. A layer of positive photoresist (Shipley SPR510A) was then spun coated over the bottom antireflective coating. Interferometric lithography (IL) with a 355-nm tripled YAG laser source was used to produce the periodic pattern 120 including a plurality of rectangular structures 125, as shown in FIG. 1. Parallel PR/wet-i lines 120 having a period of about 1500 nm were formed on the Si substrate 110 after exposing, baking, and developing.

In general, isotropic surfaces of positive photoresist have a contact angle of about 76°, which is significantly different from the contact angle for isotropic surfaces of silicon, which is approximately 38°. However, strongly anisotropic wetting behavior was exhibited by the exemplary 1D photoresist pattern 120, shown in FIG. 1A. FIG. 1B shows contact angle $\theta_y$ of about 51° measured parallel to the direction of the 1D photoresist pattern 120 with about 1.5 µL droplet of water. FIG. 1C shows contact angle $\theta_x$ of about 130° measured orthogonal to the direction of the 1D photoresist pattern 120 with about 1.5 µL droplet of water. $\Delta\theta$ ($=\theta_x-\theta_y$), a measure of the wetting anisotropy was found to be about 79°. Furthermore, the wetting was ultra-hydrophobic ($\theta_x>120°$) in the direction perpendicular to the photoresist lines 125.

While not intending to be bound by any specific theory, it is believed that the observed anisotropic wetting is due to discontinuities in the three-phase (liquid-solid-gas) contact line and pinning of the droplet along the 1D structure 125, causing preferential spreading parallel to the photoresist lines 125. Furthermore, the definite delineation (substantially vertical sidewalls) between the two surfaces: the top surface 122 of the photoresist lines 125 and the surface 114 of the substrate 110 between the photoresist lines 125 is believed to be important for the phenomenon of strongly anisotropic wetting.

Example 2

Preparation of a Surface Including a Pattern with a Period of about 800 nm

FIG. 2 shows a schematic illustration of another exemplary surface 200 including a plurality of rectangular structures 225 formed using a negative photoresist NR7-500P (Futurrex, Inc., Franklin, N.J.) with a periodicity of 800 nm. Well defined 1D photoresist structures 225 with minimal sidewall standing waves were formed atop a bottom antireflective coating, BARC iCON7 (Brewer Science, Rolla, Mo.) using interferometric lithography with a 355 nm frequency tripled YAG laser source. Each of the plurality of rectangular structures 225 had a width and a depth of about 500 nm and a distance of about 300 nm between them, giving a duty cycle (width of photoresist wall:width of empty channel) of about 5:3.

The 1D nanopatterned surface 200 exhibited strongly anisotropic wetting with $\Delta\theta$ of about 74°; with $\theta_x$ of about 126°; and $\theta_y$ of about 52°. Furthermore, the wetting was found to be ultra-hydrophobic ($\theta_x$>120°) in the direction perpendicular to the photoresist lines 225.

Example 3

Preparation of a Surface Including a Pattern with a Period of about 1000 nm

FIG. 3 shows a schematic illustration of another exemplary surface 300 including a plurality of rectangular structures 325 formed on a positive photoresist, SPR 505A (Futurrex, Inc., Franklin, N.J.) with a periodicity of 1000 nm using interferometric lithography. Each of the plurality of rectangular structures 325 had a height of about 800 nm, a width of about 250 nm, and a duty cycle of about 1:4.

The 1D nanopatterned surface 300 exhibited strongly anisotropic wetting with $\Delta\theta$ of about 81°; with $\theta_x$ of about 130° and $\theta_y$ of about 49°.

While not intending to be bound by any specific theory, but shown by Examples 1, 2, and 3 having a period of 1500 nm, 800 nm, and 100 nm respectively, it is believed that the periodicity of the patterns 100, 200, 300 can have only a modest effect on strongly anisotropic wetting. Furthermore, the anisotropy is only weakly dependent on the duty cycle as well, as shown by Examples 2 and 3 having a duty cycle of 5:3 and 1:4 respectively. Furthermore, the somewhat larger wetting anisotropy for the exemplary surface 300 in comparison to the surface 200 is believed to be due to the pattern's 320 morphology with the small duty cycle (wide open channels) and high aspect ratio (high PR walls) in surface 300. As a result, the water droplets have a larger energy barrier along the direction perpendicular to the photoresist lines 325.

Example 4

Effect of a Layer of Silica Nanoparticles Over a 1D Pattern on Wettability

FIG. 4 shows a schematic illustration of an exemplary surface 400 including a photoresist pattern 420 formed using interferometric lithography. The phototresist pattern including a plurality of rectangular structures 425 has a periodicity of about 1500 nm period. The surface 400 also include a layer of silica nanoparticles 450 disposed over the photoresist pattern 420, such that the silica nanoparticles 450 fully cover the trenches between photoresist walls 426 and partially cover the top-surfaces 422 of the rectangular structures 425. The deposition of the layer of silica nanoparticles 450 changed the surface wetting of the 1D photoresist pattern 420 from strongly anisotropic hydrophobicity ($\Delta\theta$=79°; $\theta_x$: 130°; $\theta_y$: 51°) to strongly anisotropic hydrophilicity ($\Delta\theta$=30°; $\theta_x$: 38°; $\theta_y$: 8°).

Another alternative parameter to describe wetting anisotropy is droplet distortion, $D_d$=L/W where the L is the length of the major axis (along the y-direction, parallel to the direction of the 1D photoresist pattern) divided by the width of the minor axis W (along the x-direction, orthogonal to the direction of the 1D photoresist pattern). Even though the degree of wetting anisotropy $\Delta\theta$ of about 30° is small for the modified 1D photoresist pattern 420, the droplet distortion for the modified photoresist pattern 420 can be as large as about 10 due to the hydrophilic wetting in both directions. While not intending to be bound by any specific theory, this droplet distortion can be attributed to the difference in the wetting energy barrier in the two directions.

Example 5

Factors Influencing the Wetting Anisotropy of a Surface

Figure 5:
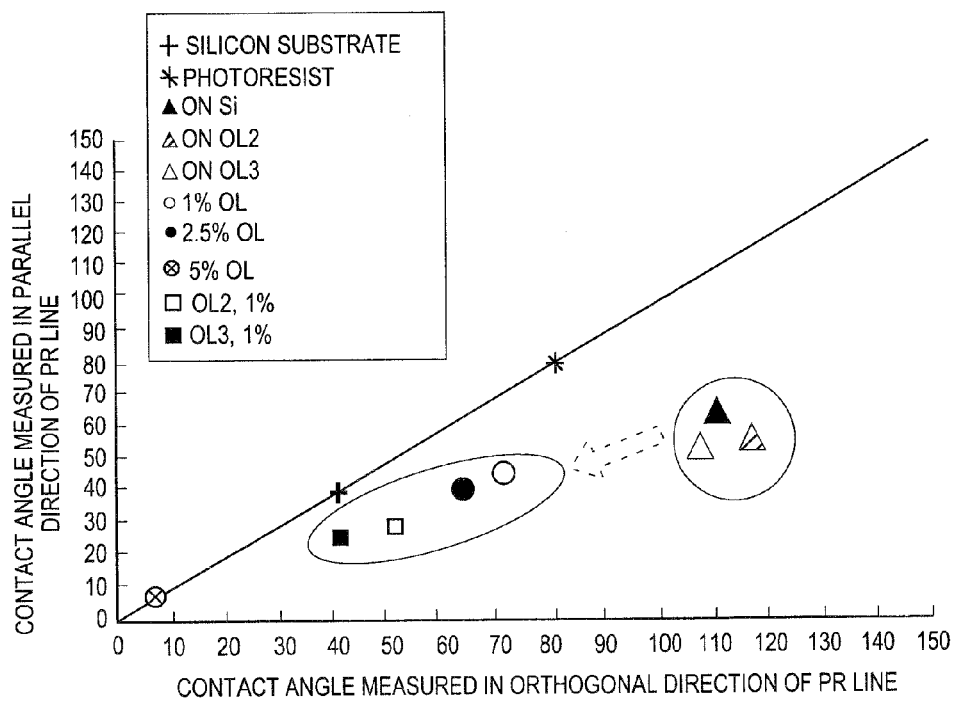
FIG. 5 is a graph showing influence of the substrate surface wetting properties on the wetting anisotropy, in accordance with various embodiments of the present teachings.

FIG. 5 is a graph showing the influence of the substrate's 110 surface 114 wetting properties on the wetting anisotropy by manipulating the surfaces 114 from hydrophobic to hydrophilic. The influence of silica nanoparticle films underneath the photoresist pattern 120 is shown by data points "On OL2" and "On OL3", which were formed by spin-coating about 50 nm diameter silica nanoparticles (ST-OL, Nissan Chemical America Corporation, Houston, Tex.) twice in "On OL2" and three times in "On OL3" onto a silicon substrate. The spin coating solution was a 5 wt % solution of the nanoparticles in deionized water. Blanket silica nanoparticle films exhibited hydrophilic wetting with a contact angle of about 5°. A one-dimensional (1D) photoresist pattern 120 was then fabricated atop the blanket silica nanoparticle films using interferometric lithography. As shown in FIG. 5, the anisotropic wetting behavior for 1D photoresist pattern 120 on a silicon substrate 110 shown by "On Si" was very similar to that on the silica nanoparticles film "On OL2" and "On OL3". The three samples, "On Si", "On OL2", "On OL3" are within a circle exhibiting strongly anisotropic hydrophobic wetting. Therefore, the anisotropic wetting on 1D photoresist pattern 120 is only weakly dependent on the wetting properties of the substrate 110.

FIG. 5 also shows modification of the anisotropic wetting from hydrophobic to hydrophilic by deposition of a layer of silica nanoparticles 450 over the 1D photoresist pattern 420, as indicated by the arrow. The data points "1% OL", "2.5% OL", "5% OL" represent a layer of 1 wt. %, 2.5 wt. %, and 5 wt. % silica nanoparticles disposed over the 1D photoresist pattern respectively. The data points "OL2, 1%", "OL3, 1%" represent 2 layers and 3 layers respectively of 1 wt. % silica nanoparticles disposed over the 1D photoresist pattern. As can be seen from FIG. 5, with the increase in the concentrations of the silica nanoparticles in the suspension and the thicknesses of the overlayer, there is a move towards anisotropic hydrophilic wetting, with the wetting becoming almost isotropic and strongly hydrophilic for a 5 wt % concentration, which almost completely filled the grooves and covered the photoresist tops (picture not shown).

Example 6

Wetting Characteristics of a Patterned Substrate

FIG. 6A shows a schematic illustration of a surface 600A including a negative photoresist pattern including a plurality of rectangular structures 635 disposed over an antireflective coating 660. After forming 1D photoresist grooves with negative photoresist, an oxygen plasma with one minute etching time was used to etch through the BARC, as shown in FIG. 6B. Then, the mixture of $O_2$ and $CHF_3$ (flow rate 10 sccm, pressures: $O_2$ 5 mT and $CHF_3$ 90 mT, RF power 100 W) was used to etch the Si for 12 minutes. Finally, the remaining BARC/PR patterns were removed with piranha solution. FIG. 6C shows a schematic illustration of a surface 600C including silicon grooves 625' with 500-nm periodicity.

Simultaneous etching of the photoresist structures 625 as well as the silicon substrate 610 with a plasma mixture of $CHF_3$ and $O_2$ resulted in deep Si grooves 625' having quite thin Si walls as shown in FIG. 6C. The 1D Si grooves 625', with fresh hydroxyl groups resulting from the final piranha clean, exhibited hydrophilic, slightly anisotropic wetting with $\theta_x=39°$, $\theta y=33°$, and $\Delta\theta=6°$.

Example 7

Effect of Plasma Treatment on the Wetting Anisotropy of a Surface

Table 1 summarizes the results of plasma treatment with $CHF_3$ and $O_2$ of the positive (SPR505A, Rohm and Haas, Philadelphia, Pa.) and negative (NR7-500P, NR7-250P, Futurrex, Inc., Franklin, N.J.) photoresist patterns formed over a BARC layer (iCON7 from Brewer Science, Rolla, Mo.) to tailor the anisotropic wetting. Plasma treatment was performed with a standard reactive ion etching (RIE) process. Both oxygen and $CHF_3$ plasma treatments were carried out at a flow rate of about 10 sccm, pressure of about 10 mTorr, RF power of about 45 W for about 20 seconds.

As shown in the Table 1, the strong anisotropic wetting ($\Delta\theta=74°$ and 81°) of the original positive photoresist sample and the negative photoresist sample can be changed to only slightly anisotropic ($\Delta\theta=19°$ and 32°) ultra-hydrophobic ($\theta_x=127°$ and 140°) wetting behavior by a short $CHF_3$ plasma treatment. Surface chemical changes are mainly responsible for this change of the surface wetting; the surface morphology is unchanged by these short plasma treatments. The use of $CF_4$ plasma treatment instead of $CHF_3$ plasma treatment resulted in similar change in wetting characteristics.

As shown in Table 1, after a short oxygen plasma treatment, both of the original positive photoresist sample and the negative photoresist sample exhibited ultra-hydrophilic ($\theta_x=0°$ and 5°) wetting with a reduced degree of anisotropy. Even though the contact angle is almost zero in both x and y direction, the stretching of the water droplet along the 1D photoresist lines was observed by visual inspection. Overall, the 1D photoresist patterns are only slightly modified from the original profiles with the short duration plasma etching with $CHF_3$ or $O_2$. With longer plasma treatment for up to 60 seconds, the 1D patterned surfaces exhibited isotropic, super-hydrophilic wetting.

TABLE 1

| Sample with | Original | | | After $CHF_3$ Plasma | | | After $O_2$ Plasma | |
|---|---|---|---|---|---|---|---|---|
| Pattern on | $\theta_x$ | $\theta_y$ | $\Delta\theta$ | $\theta_x$ | $\theta_y$ | $\Delta\theta$ | $\theta_x$ | $\theta_y$ |
| Positive PR | 126° | 52° | 74° | 127° | 108° | 19° | 0° | 0° |
| Negative PR | 130° | 49° | 81° | 140° | 108° | 32° | <5° | 0° |
| Si | 39° | 33° | 6° | 95° | 79° | 16° | — | — |

Also shown in Table 1, is the effect of plasma treatment on the original 11D Si grooves 625' of Example 6. With 20 seconds of $CHF_3$ treatment, the wetting moved towards anisotropic wetting ($\theta_x=95°$, $\theta y=79°$ and $\Delta\theta=16°$) and with further $CHF_3$ treatment for 60 seconds, the surface became ultra-hydrophobic and more anisotropic ($\theta_x=128°$, $\theta y=83°$ and $\Delta\theta=45°$). The differences of wetting anisotropy between Si grooves 625' and 1D photoresist pattern 625 are due to both the chemical composition and the topography of the 1D pattern.

Example 8

Recovering Anisotropic Wetting of a 1D Pattern after Plasma Treatment

FIG. 7A shows a schematic illustration of a surface 700A including positive photoresist structures 725 over an antireflective coating 760 after plasma treatment. FIG. 7B shows a schematic illustration of a surface 700B after spin coating with negative photoresist 725" over the positive photoresist structures 725. As can be seen in FIG. 7B, shallow grooves were formed after spin-coating of the negative photoresist 725". The interface between original positive photoresist pattern and the covering negative photoresist pattern is marked with a white dotted line in FIG. 7B. Even though the periodicity is retained, the grooves 725" have much shallower and smoother profiles than before. The wetting anisotropy of the surface 700B ($\Delta\theta=35°$) is larger than before deposition of negative photoresist and after CHF3 plasma treatment ($\Delta\theta=19°$), but smaller than the original sample ($\Delta\theta=74°$), as shown in Table 1. In various embodiments, another approach to recovering strongly anisotropic wetting can include forming a conformal layer of polymer by plasma polymer deposition.

All of the patterns in Examples 1 to 8 were formed using interferometric lithography with a 355-nm frequency tripled YAG laser source.

While the invention has been illustrated respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." As used herein, the phrase "one or more of", for example, A, B, and C means any of the following: either A, B, or C alone; or combinations of two, such as A and B, B and C, and A and C; or combinations of three A, B and C.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A surface comprising:
   a substrate;
   a plurality of rectangular shaped structures arranged to form a macroscopic pattern over the substrate; and
   a hydrophobic region surrounding a periphery of the macroscopic pattern configured to direct a fluid to the macroscopic pattern,
   wherein the plurality of rectangular shaped structures delineate a top surface of the macroscopic pattern from a surface of the substrate, each of the plurality of rectangular shaped structures comprising substantially vertical walls having a height of about 100 nm to about 10 µm; and
   wherein a shape of the macroscopic pattern, the height of the substantially vertical walls, and a surface chemistry of the top surface controls anisotropic wetting on the top of the rectangular structures.

2. The surface of claim 1, wherein the pattern further comprises surface treatment to tune the anisotropic wetting selected from the group consisting of a hydrophobic, an ultra-hydrophobic, a super-hydrophobic, a hydrophilic, and a super-hydrophilic surface.

3. The surface of claim 2, wherein the surface treatment comprises a thin layer of nanoparticles disposed over the pattern.

4. The surface of claim 3, wherein the surface treatment comprises a thin layer of silica nanoparticles disposed over the pattern.

5. The surface of claim 3, wherein the surface treatment comprises a thin layer of functionalized nanoparticles disposed over the pattern, wherein the nanoparticles are functionalized for one or more of photonics, catalysis, chemical/biological sensing, separation, bio-mimic structure, and nanofluidic applications.

6. The surface of claim 2, wherein the surface treatment comprises plasma treatment of the pattern with one or more gases selected from the group consisting of oxygen, $CF_4$, and $CHF_3$, $CH_2F_2$, $CH_3F$, and other related carbon-hydride-halide species.

7. The surface of claim 1, wherein one or more rectangular shaped structures is arranged in one or more ways selected from the group consisting of straight, circular, square, and serpentine.

8. The surface of claim 1, wherein the plurality of rectangular shaped structures are arranged to form a plurality of patterns, wherein the plurality of patterns are arranged in one of the ways selected from the group consisting of parallel, at an angle, serpentine, and perpendicular.

9. A microfluidic device comprising the surface of claim 1.

10. A microreactor comprising the surface of claim 1.

11. A lab-on-a-chip system comprising the surface of claim 1.

12. A method for using a pattern to control fluid flow, the method comprising:
    depositing a photosensitive film stack over a substrate;
    forming a macroscopic pattern on the film stack, the macroscopic pattern comprising a plurality of rectangular shaped structures, wherein the plurality of rectangular shaped structures delineate a top surface of the macroscopic pattern from a surface of the substrate, each of the plurality of rectangular shaped structures comprising substantially vertical walls having a height of about 100 nm to about 10 µm and wherein the shape of the macroscopic pattern, the height of the substantially vertical walls, and a surface chemistry of the top surface controls anisotropic wetting at the top surface of the rectangular structures;
    delimiting the macroscopic pattern comprising the plurality of rectangular shaped structures, wherein a periphery of the macroscopic pattern is surrounded by a hydrophobic region to direct a fluid to the macroscopic pattern; and
    tuning the anisotropic wetting at the top surface of the rectangular structures to guide the fluid flow on top of the pattern, wherein the fluid flow is controlled using one or more of gravity, electric field, and magnetic field.

13. The method for using a pattern to control fluid flow according to claim 12, wherein the step of forming a pattern on the film stack comprises forming a pattern using a technique selected from the group consisting of photolithography, nanoimprint lithography, interferometric lithography, e-beam lithography, ion-beam lithography, strained microwrinkling, and embossing.

14. The method for using a pattern to control fluid flow according to claim 12, wherein the step of forming a pattern on the film stack comprises forming a plurality of rectangular shaped structures, such that one or more rectangular shaped structures is arranged in one or more ways selected from the group consisting of straight, circular, square, and serpentine.

15. The method for using a pattern to control fluid flow according to claim 12, wherein the step of forming a pattern on the film stack comprises forming a plurality of patterns, each of the plurality of patterns comprising a plurality of rectangular shaped structures, wherein the plurality of patterns are arranged in one of the ways selected from the group consisting of parallel, at an angle, serpentine, and perpendicular.

16. The method for using a pattern to control fluid flow according to claim 12, wherein the step of tuning the anisotropic wetting at the top surface of the rectangular structures to control the fluid flow on top of the pattern comprises forming a thin layer of nanoparticles over the pattern.

17. The method for using a pattern to control fluid flow according to claim 16, wherein the step of forming a thin layer of nanoparticles over the pattern comprises forming a thin layer of silica nanoparticles over the pattern.

18. The method for using a pattern to control fluid flow according to claim 16 further comprising modifying surface of nanoparticles to provide additional functionality, wherein the surface of nanoparticles is functionalized for one or more of photonics, catalysis, chemical/biological sensing, separation, bio-mimic structure, and nanofluidic applications.

19. The method for using a pattern to control fluid flow according to claim 12, wherein the step of tuning the anisotropic wetting at the top surface of the rectangular structures to control the fluid flow on top of the pattern comprises using plasma treatment of the pattern with one or more gases selected from the group consisting of oxygen, $CF_4$, and $CHF_3$, $CH_2F_2$, $CH_3F$, and other related carbon-hydride-halide species.

20. The method for using a pattern to control fluid flow according to claim 12 further comprises transferring the pattern from the film stack onto the substrate.

21. A method of confining liquid in limited area structures, the method comprising:
    depositing a photosensitive film stack over a substrate;
    forming a pattern on the film stack, the pattern comprising a plurality of rectangular shaped structures, wherein the plurality of rectangular shaped structures delineate a top surface of the pattern from a surface of the substrate, each of the plurality of rectangular shaped structures comprising substantially vertical walls having a height of about 100 nm to about 10 μm and wherein a shape of the macroscopic pattern, the height of the substantially vertical walls, and a surface chemistry of the top surface controls anisotropic wetting at the top surface of the rectangular structures;

delimiting the pattern comprising the plurality of rectangular shaped structures, wherein a periphery of the pattern is surrounded by a hydrophobic region to direct a fluid to the pattern; and tuning the anisotropic wetting at the top surface of the rectangular structures to guide the fluid flow on top of the pattern; and immersing and removing the substrate in a liquid bath, wherein upon removal the liquid is confined only to the pattern.

22. The method of guiding liquid in limited area structures according to claim 21, wherein the step of tuning the anisotropic wetting at the top surface of the rectangular structures comprises forming a thin layer of nanoparticles over the pattern.

23. The method of guiding liquid in limited area structures according to claim 21, wherein the step of tuning the anisotropic wetting at the top surface of the rectangular structures to control the fluid flow on top of the pattern comprises using plasma treatment of the pattern with one or more gases selected from the group consisting of oxygen, $CF_4$, and $CHF_3$, $CH_2F_2$, $CH_3F$, and other related carbon-hydride-halide species.

24. A method of segregating particles comprising:

providing an anisotropic hydrophobic surface comprising a pattern, a periphery of the pattern surrounded by a hydrophobic region to direct a fluid to the pattern, the pattern comprising a plurality of rectangular shaped structures, wherein the plurality of rectangular shaped structures delineate a top surface of the pattern from a surface of the substrate, each of the plurality of rectangular shaped structures comprising substantially vertical walls having a height of about 100 nm to about 10 μm and wherein the shape of the macroscopic pattern, the height of the substantially vertical walls, and a surface chemistry of the top surface controls anisotropic wetting at the top surface of the rectangular structures;

providing a liquid comprising colloidal particles over the anisotropic hydrophobic surface, such that the liquid spreads out widely with a low vertical height and enlarged contact lines with two circular ends; and evaporating the liquid over the anisotropic hydrophobic surface, wherein the liquid evaporates with an initial decrease of the contact angle with only a small change of the contact line, such that a wide band of particles can be deposited at the two circular ends and narrow band along the contact line connecting the two circular ends.

* * * * *